United States Patent
Granitz et al.

(10) Patent No.: US 7,584,619 B2
(45) Date of Patent: Sep. 8, 2009

(54) SYSTEM FOR REDUCING OIL CONSUMPTION IN GAS TURBINE ENGINES

(75) Inventors: Charles Robert Granitz, Loveland, OH (US); Mark Eden Zentgraf, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 11/735,020

(22) Filed: Apr. 13, 2007

(65) Prior Publication Data

US 2007/0180830 A1  Aug. 9, 2007

Related U.S. Application Data

(62) Division of application No. 09/998,432, filed on Nov. 29, 2001.

(51) Int. Cl.
  *F02C 6/04* (2006.01)
(52) U.S. Cl. .......... 60/785; 60/39.08; 415/110; 184/6.4
(58) Field of Classification Search .......... 60/782, 60/785, 39.08; 415/110, 111, 112; 184/6.4, 184/6.12, 6.11, 6.13
See application file for complete search history.

(56) References Cited

U.S. PATENT DOCUMENTS

| | | | | |
|---|---|---|---|---|
| 1,728,268 | A | * | 9/1929 | Flanders .................. 184/6.21 |
| 3,321,910 | A | * | 5/1967 | William et al. ........... 60/39.08 |
| 3,527,054 | A | * | 9/1970 | Hemsworth ............... 60/39.08 |
| 3,722,624 | A | * | 3/1973 | Buckland .................. 184/6.11 |
| 4,433,539 | A | * | 2/1984 | Norris et al. .............. 60/39.08 |
| 5,611,661 | A | | 3/1997 | Jenkinson |
| 6,470,666 | B1 | * | 10/2002 | Przytulski et al. ........... 60/772 |
| 6,550,253 | B2 | * | 4/2003 | Mortzheim et al. .......... 60/782 |
| 6,799,112 | B1 | * | 9/2004 | Carter et al. ............... 701/100 |
| 2007/0125092 | A1 | * | 6/2007 | Wolfe et al. ................. 60/782 |

* cited by examiner

*Primary Examiner*—William H Rodriguez
(74) *Attorney, Agent, or Firm*—V G Ramaswamy; William Scott Andes

(57) ABSTRACT

A system for reducing oil usage from a sump in a gas turbine engine. Two sources of oil usage, which usage includes leakage and consumption, have been identified: (1) during idle, leakage of oil from an oil sump through seals and (2) during high-power operation, consumption of oil entrained in vent air exiting from the sump. At idle, the invention reduces pressure in the sump, to thereby increase airflow across the seals into the sump, to inhibit the oil leakage across the seals. At high power operation, the pressure reduction is terminated, but flow exiting the vent is artificially restricted.

8 Claims, 4 Drawing Sheets

SYSTEM FOR REDUCING OIL CONSUMPTION IN GAS TURBINE ENGINES

CROSS REFERENCE TO RELATED APPLICATION

This application is a divisional patent application of co-pending application Ser. No. 09/998,432, filed on Nov. 29, 2001.

TECHNICAL FIELD

The invention reduces losses of lubricating oil in a gas turbine engine due to leakage through (1) seals in an oil sump at low power and (2) a vent system of the sump at high power.

BACKGROUND OF THE INVENTION

FIG. 1 is a simplified schematic of a sump system in a gas turbine engine. Items 3 represent a common oil-wetted chamber, called the bearing sump chamber or cavity, and items 6 represent a second, different common chamber, called the sump pressurization chamber.

Oil 9 is delivered by a nozzle 12 to a bearing 15 for lubrication and cooling. After usage by the bearing 15, the oil is gravity-drained to the bottom of in the sump chamber 3, and then evacuated by a scavenge system (not shown), as indicated by arrow 18. The scavenged oil is cooled, filtered, returned in oil stream 9.

Because of windage and splashing, some oil contained in the sump chamber 3 will ordinarily tend to leak into the sump pressurization chamber 6. To inhibit this leakage, various rotating seals 24, supported by a rotating shaft 27, isolate the sump chamber 3 from the pressurization chamber 6. Since the seals 24 do not perfectly block oil migration, airflow is generated across the seals 24 to further inhibit oil migration.

To generate this airflow, incoming air, represented by dashed arrow 30, pressurizes the pressurization chamber 6. This air is driven through the seals 24 by the positive pressure differential across the seals, as indicated by dashed arrows 33. This pressurization air velocity serves to keep splashing oil out of the seals 24 in the sump chamber 3, and to reduce its migration into the pressurization chamber 6.

The pressurization air, now present within the sump chamber 3, then exits through a sump vent 36, as indicated by dashed arrow 39, after passing through an air/oil separator (not shown).

The Inventors have observed that this approach is not necessarily optimal in modern gas turbine engines which are designed to produce larger thrusts than previously.

SUMMARY OF THE INVENTION

In one form of the invention, pressure in the sump chamber is artificially reduced during engine idle, to increase the positive pressure differential across the seals, to thereby increase airflow velocity across the seals. In another form of the invention, flow exiting the sump chamber is artificially inhibited during high-power operation, to reduce flow through a constriction 85 in FIG. 2, which is located at the exit of the sump chamber.

DETAILED DESCRIPTION OF THE INVENTION

Figure 1:
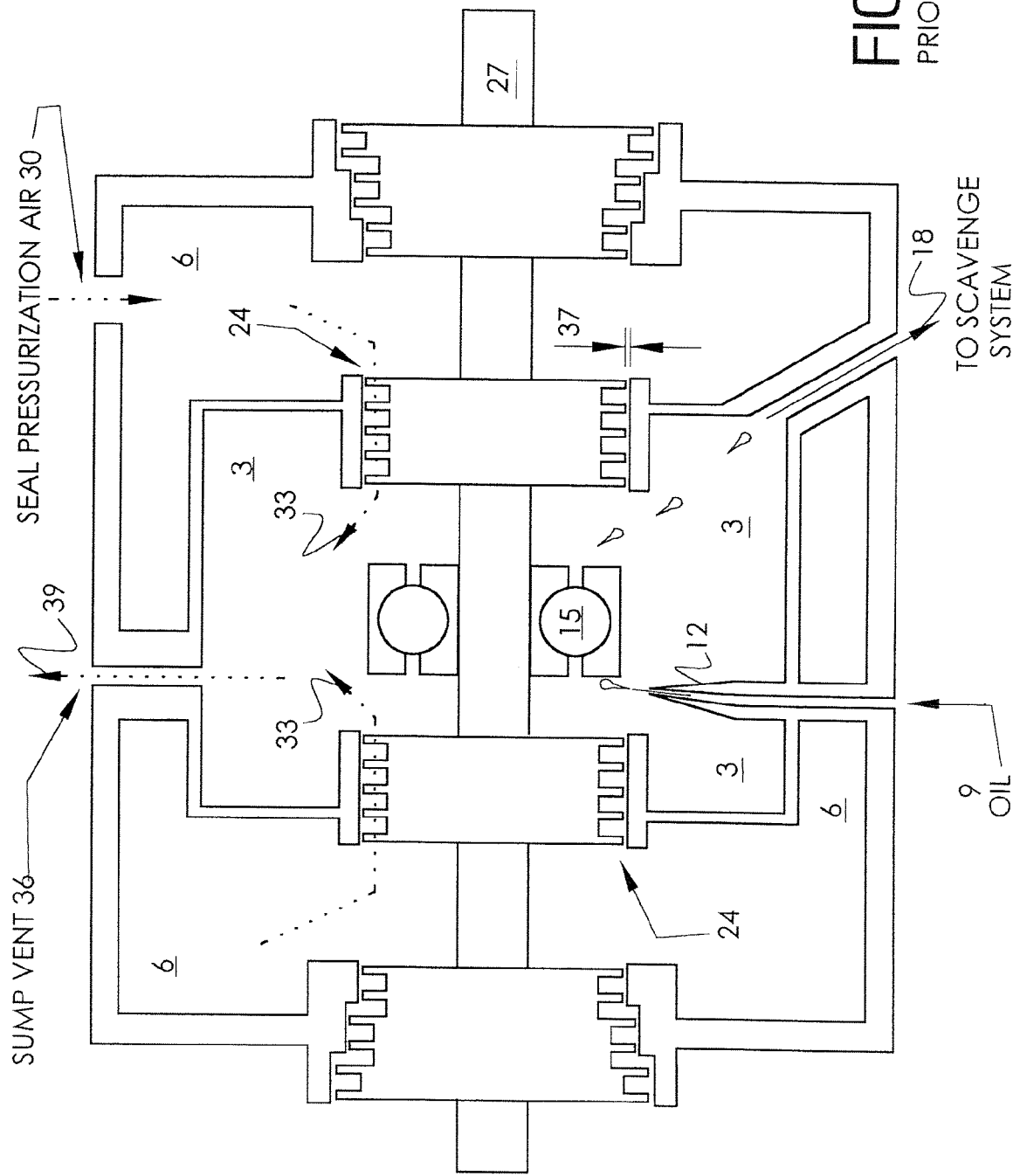
FIG. 1 illustrates a sump system in the prior art.

The Inventors have observed two problems in the system of FIG. 1, when used in a relatively large gas turbine engine, of the 90,000 pound thrust class. One problem is that, at idle speeds, the pressure differential between the sump pressurization cavity 6 and the sump chamber 3 is too small to provide sufficient airflow velocity across seals 24. Thus, oil leakage across seals 24 can occur: oil leaks across the seals 24 in the direction opposite to dashed arrows 33.

A second problem is that, at high-power operation, significant oil is lost through the vent 36. It is suspected that this latter loss arises because of a combination of factors. One factor is that the seals 24 are of larger diameter than previous seals of their type, thus presenting a larger cross-sectional area which must be sealed. This larger cross-sectional area provides greater flow into sump 3, thus providing greater flow through vent 36.

A second factor is that the larger seals 24 have a larger clearance. That is, the distance corresponding to distance 37 in FIG. 1 is larger. Larger clearances generally imply larger leakage.

A third factor is that the pressure differential across the seals 24 may be larger than in previous cases. A fourth factor is an increased temperature of the region of the seal 24.

In overview, one form of the invention mitigates both (1) leakage across the seals 24 at idle and (2) leakage through the vent 36 at high power. The invention does so by (1) artificially increasing the pressure differential between chambers 3 and 6 during idle operation, with chamber 3 being evacuated to a smaller pressure, and (2) restricting flow through vent 36 during high-power operation.

This is contrary to the operation of the system shown in FIG. 1, wherein a given pressure differential exists between chambers 3 and 6 at idle operation, and that pressure differential increases as engine power increases, thereby increasing flow through the vent 36.

Figure 2:
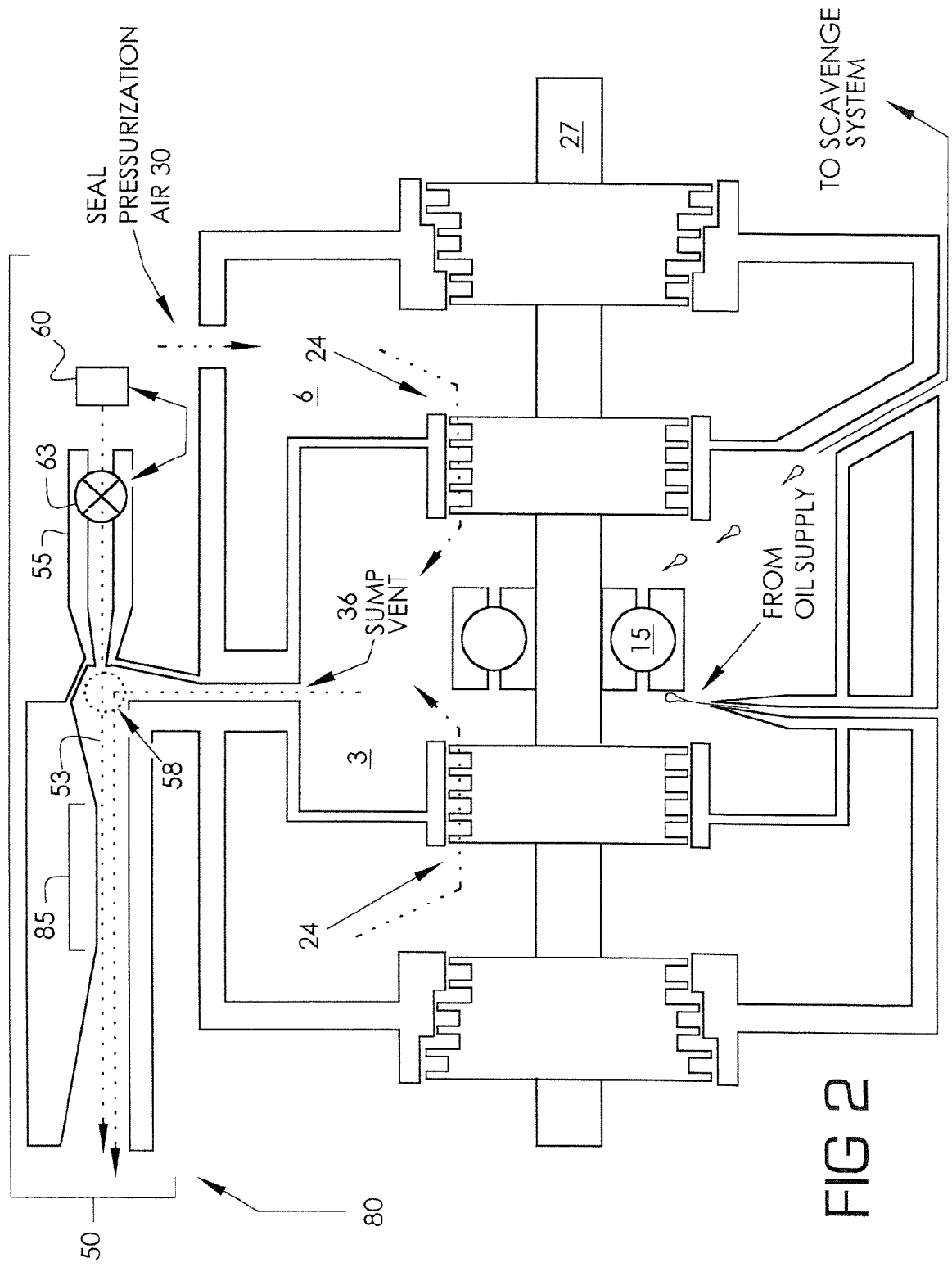
FIGS. 2 and 4 illustrate two forms of the invention.

FIG. 2 illustrates one form of the invention, in schematic form. An eductor 50, also called an air jet ejector, creates a lower pressure in sump chamber 3 than would otherwise prevail. The eductor 50 is powered by a jet 53 of air delivered by a nozzle 55. The nozzle 55 receives pressurized air from a compressor bleed (not shown in FIG. 2, but shown in FIG. 4 and discussed later).

Eductors in general are known in the art. Their operation can be understood by the following two principles, which may actually be two different statements of a single more fundamental principle. As to one principle, the eductor 50 entrains air present in region 58 into the jet 53, thereby removing the entrained air from region 58. The removal causes additional air to flow from the sump chamber 3, through the sump vent 36, to replace the removed air. As to the other principle, the jet 53 generates a low static pressure in region 58, based on Bernoulli's Law, which causes air to flow from the sump chamber 3 through sump vent 36.

Accordingly, the eductor 50, by removing air from the sump chamber 3, creates a lower-than-normal pressure in the sump chamber 3, thereby increasing the pressure differential from the second chamber 6 to the sump chamber 3. This increased differential will increase airflow velocity across seals 24, thereby more effectively preventing oil from entering seals 24 and thus leaking from the sump chamber 3.

A gauge-type pressure sensor 60 measures the pressure differential. When the differential falls below a specific threshold, the sensor 60 opens a valve 63, which initiates the jet 53, and brings the eductor 50 into operation. When the differential rises above a floor, the sensor 60 closes the valve 63, thereby terminating operation of the eductor 50.

The threshold and the floor may be the same, thus providing a simple set-point type of operation. Alternately, they may be different, in which case a type of hysteresis or dead band would be introduced.

The preceding mode of operation is used at engine idle speeds. At high-power conditions, such as during cruise operation of an aircraft, the eductor 50 remains inactive, because the pressure differential is above the floor described above. However, as the Background of the Invention pointed out, under these high-power conditions, excess airflow through the sump vent 36 is believed to cause undesirable oil consumption, as by entraining oil in the airflow passing through the vent 36.

To inhibit this oil consumption, the mixing throat of eductor 50 is designed to provide an exit path restriction to the air exiting the sump vent 36.

Eductor 50 is designed to present a flow-limiting restriction, represented by constriction 85. This restriction limits the amount of airflow passed by the eductor 50 during high-power operation, when valve 63 is closed.

Therefore, one form of the invention can be viewed as providing two mirror-image types of operation. At low engine speeds, such as at ground idle, the pressure within the sump chamber 3 is artificially reduced. That is, ordinarily, the pressure in that chamber 3 would be about 0.10 psig, pounds per square inch gauge. The invention reduces the pressure to about negative 0.5 psig, a negative value. The reduction is accomplished by the active withdrawal of air, caused by the eductor 50. This lowering increases the air flowing across seals 24, from the pressurization chamber 6 to the sump chamber 3.

At high-power operation, such as at normal cruise engine speeds and above, the invention artificially restricts flow through vent 36, because of the constriction 85. This constriction will cause an increase in the pressure within sump chamber 3, over that which would occur if the constriction 85 were absent.

Ordinarily, at cruise altitude, the pressure within the sump chamber 3 would be about 3.0 psig. The invention increases that pressure, by restricting flow through the eductor 50, which has been added to the exit of sump vent 36.

Stating the latter in a different way, if the constriction 85 in the eductor were not present, then, under the conditions just described, flow through vent 36 would have a value of, say, X pounds per second. Under one form of the invention, that flow is now limited to 85 percent of X.

One embodiment of the invention was adapted to a pre-existing engine, which was designed with vents 36 of a relatively low cross section. Because of the low cross section, the relatively high percentage of 85 as just stated was required. Nevertheless, an engine can be re-designed so that the cross-section of vent 36 is larger. In such a case, the required pressure differential can be attained with a lower mass flow than 85, including a flow in the range of 70 percent, or less.

Figure 3:
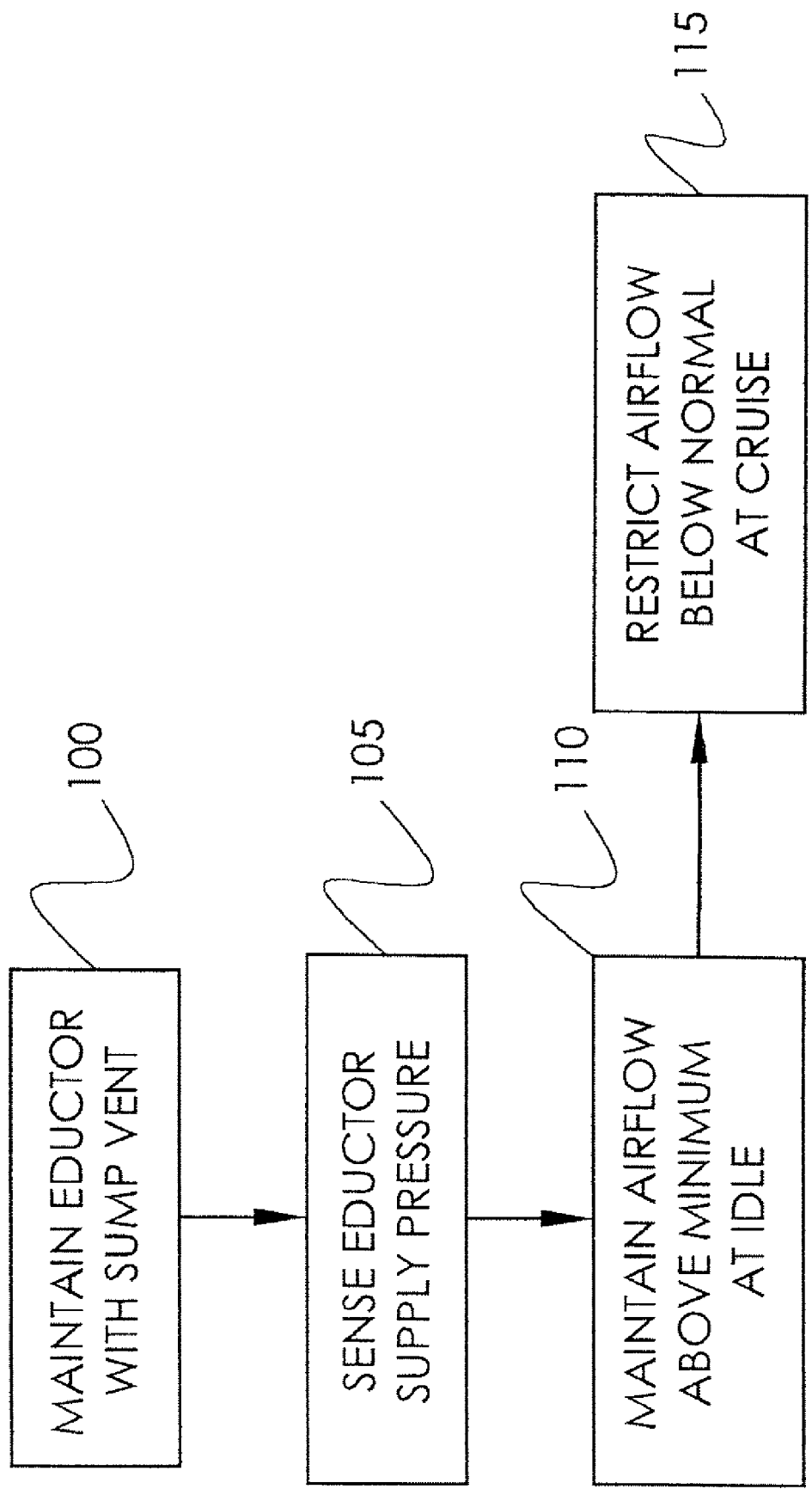
FIG. 3 is a flow chart illustrating processes undertaken by one form of the invention.

FIG. 3 is a flow chart illustrating processes undertaken by one form of the invention. Block 100 indicates that an eductor is maintained in association with a vent from an oil sump in a gas turbine engine. Eductor 50 in FIG. 2 provides an example of one such eductor. Block 105 in FIG. 3 indicates that eductor supply pressure is sensed, and block 110 indicates that, when pressure falls below a minimum, airflow through vent 36 is increased, by opening valve 63, thereby driving the eductor 50 into operation.

Block 115 indicates that, at high-power operation, such as cruise operation in an aircraft, the airflow through the vent is restricted below the amount which would ordinarily occur. Block 110 is inoperative at this time: valve 63 is closed and the eductor 50 is turned off.

The discussion above focuses on pressure: the pressure sensor 60 in FIG. 2 is used to turn the eductor 50 on and off. The eductor 50, when in operation, lowers pressure at region 58.

However, another view of the invention can focus on airflow. The pressure differential indicated by sensor 60 provides a measure of amount of airflow across seals 24. Lowering pressure at region 58 serves to increase that airflow.

In one mode of overall operation, blocks 105 and 110 in FIG. 3 can be characterized as maintaining airflow leaking into the sump chamber 3 through seals 24 at a predetermined minimum level.

A significant feature will be explained. FIG. 1 illustrates normal flow through vent 36. The invention artificially alters that flow at high-power, or cruise, operation, by means of constriction 85. The flow is artificially reduced.

Also, the normal flow through vent 36 in FIG. 1 creates a normal pressure in sump 3 at idle. The invention artificially reduces that pressure by means of eductor 50, thereby increasing the leakage across seals 24.

Figure 4:
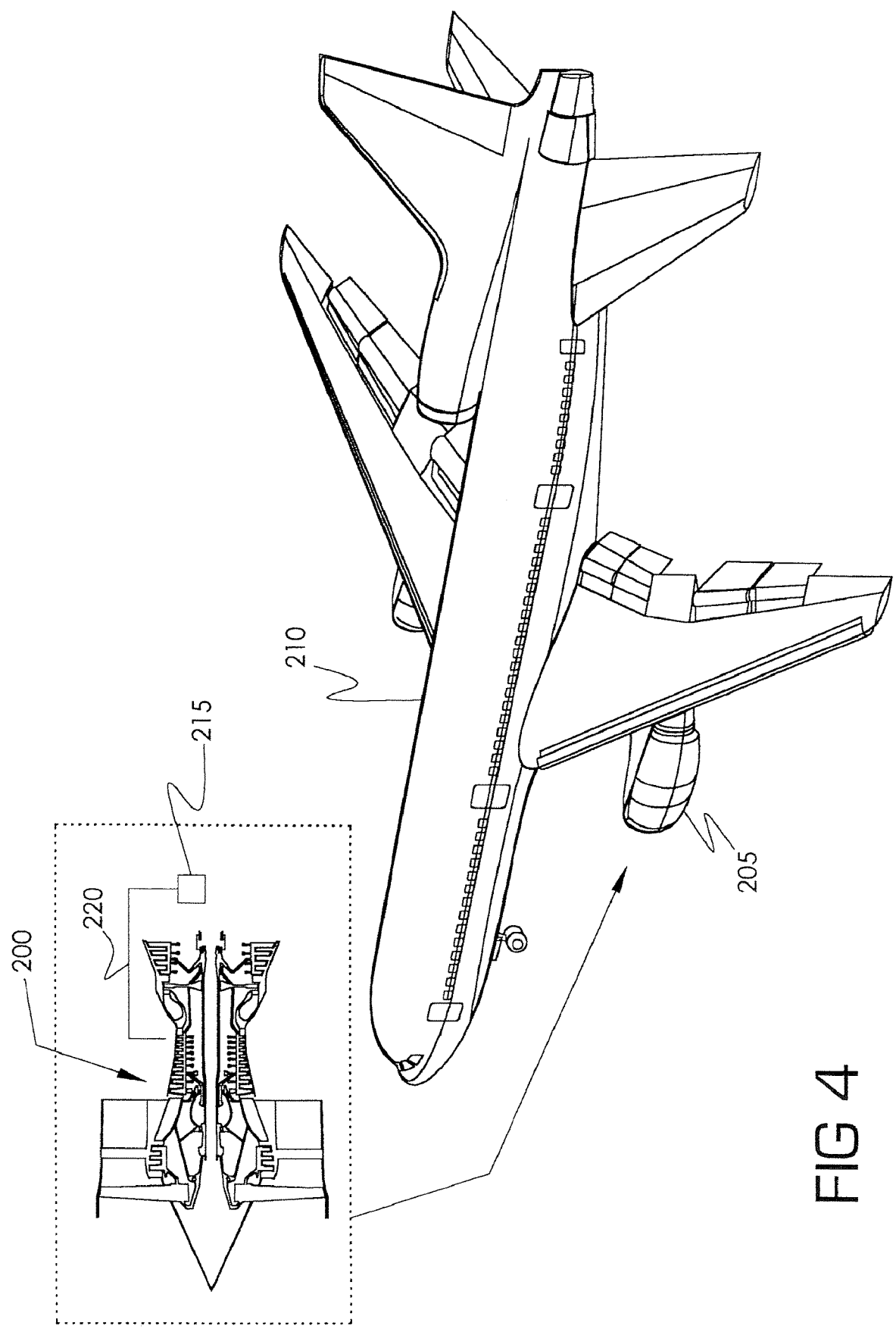

FIG. 4 illustrates one form of the invention. A generic gas turbine engine 200 is mounted in a nacelle 205 of an aircraft 210. Block 215 represents the apparatus represented in FIG. 2. A compressor bleed 220 in FIG. 4 delivers pressurized air to the valve 60 in FIG. 2 which drives eductor 50 of FIG. 2, not separately shown in FIG. 4.

From one perspective, the invention measures a parameter from which flow through the vent 36 can be computed. That is, by the continuity principle, all, or nearly all, of the flow across seals 24 in FIG. 2 must exit through the vent 36. Measuring the pressure differential across the seals 24, which indicates the amount of the flow across seals 24, allows one to also estimate the amount of flow through the vent 36.

The invention thus, in effect, determines whether the flow across the seals, unassisted by the eductor 50, would lie above a required minimum. If not, the invention activates the eductor 50 to maintain the flow above the minimum. Conversely, if the measured parameter indicates that the unassisted flow would fall above a certain value, the invention de-activates the eductor 50, because it is not needed.

In addition, it could be said that, based on Bernoulli's Law, ordinary flow through the vent 36 causes a drop in static pressure at the exit of the vent, at region 58 in FIG. 2. That is, in theory, the flow itself causes a reduction in exit pressure. The invention further lowers that pressure, by means of the eductor.

Numerous substitutions and modifications can be undertaken without departing from the true spirit and scope of the invention. What is desired to be secured by Letters Patent is the invention as defined in the following claims.

The invention claimed is:
1. Apparatus, comprising:
a) a gas turbine engine;
b) a lubrication sump in the engine having a vent;
c) a pressurization chamber for pressurizing the sump;
d) an eductor in fluid communication with the vent;

e) means for tapping pressurized air from a compressor in the engine and delivering the pressurized air to the eductor;

f) valve means for activating and de-activating delivery of pressurized air to the eductor; and g) a pressure sensor for ascertaining whether pressure in the pressurization chamber falls below that in the sump by a predetermined amount and, if so, causing the valve means to deliver pressurized air to the eductor, to thereby reduce pressure in the sump.

2. Apparatus according to claim 1, wherein the eductor comprises a flow restrictor, which restricts flow through the vent when the eductor is not activated.

3. Apparatus according to claim 1, wherein the eductor is capable of drawing air from the sump.

4. Apparatus according to claim 1 further comprising means for recovering oil scavenged from the lubrication sump.

5. Apparatus according to claim 1, wherein the eductor is capable of maintaining a flow through the vent at low engine speeds.

6. Apparatus according to claim 1, wherein the eductor comprises a flow restrictor, which is capable of restricting flow through the vent at high engine speeds.

7. Apparatus according to claim 1, wherein the eductor is capable of reducing pressure in the sump at low engine speeds.

8. Apparatus according to claim 1, wherein the eductor is capable of reducing pressure in the sump during idle operation of the engine and reducing the flow through the vent during cruise operation of the engine.

* * * * *